(12) United States Patent
Koeppe et al.

(10) Patent No.: US 8,725,943 B2
(45) Date of Patent: *May 13, 2014

(54) METHOD AND SYSTEM FOR SECURE DATA STORAGE

(71) Applicant: International Business Machines Corporation, Armonk, NY (US)

(72) Inventors: Peter VanderSalm Koeppe, San Diego, CA (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/743,056

(22) Filed: Jan. 16, 2013

(65) Prior Publication Data

US 2013/0151866 A1   Jun. 13, 2013

Related U.S. Application Data

(63) Continuation of application No. 11/971,144, filed on Jan. 8, 2008, now Pat. No. 8,386,706.

(51) Int. Cl.
*G06F 12/00* (2006.01)

(52) U.S. Cl.
USPC ............... 711/114; 711/5; 711/157; 711/156; 711/163; 711/E12.103

(58) Field of Classification Search
None
See application file for complete search history.

(56) References Cited

U.S. PATENT DOCUMENTS

| 6,501,841 | B1 | 12/2002 | Horne |
| 6,853,727 | B1 | 2/2005 | Foster et al. |
| 7,676,688 | B1 | 3/2010 | Hardman |
| 7,725,779 | B2 | 5/2010 | Lablans |
| 7,865,440 | B2 | 1/2011 | Jaquette |
| 2005/0149670 | A1 | 7/2005 | Suzuki et al. |
| 2006/0051061 | A1 | 3/2006 | Anandpura et al. |
| 2007/0195447 | A1 | 8/2007 | Starr et al. |
| 2009/0169001 | A1 | 7/2009 | Tighe et al. |

FOREIGN PATENT DOCUMENTS

| JP | 5151507 A | 6/1993 |
| JP | 2000076788 A | 3/2000 |

OTHER PUBLICATIONS

Hekstra, A.P. et al., "Guaranteed Scrambling", IEEE Transactions on Magnetics, Nov. 2005, pp. 4323-4326, vol. 41, No. 11, IEEE, USA.
Lee, D., "Scrambled Storage for Parallel Memory Systems", Proceedings of the 15th Annual International Symposium on Computer Architecture, May 30, 1988-Jun. 2, 1988, pp. 232-239, IEEE, USA.

*Primary Examiner* — Matthew Bradley
*Assistant Examiner* — Arvind Talukdar
(74) *Attorney, Agent, or Firm* — Kenneth L. Sherman, Esq.; Michael Zarrabian, Esq.; Sherman & Zarrabian LLP

(57) ABSTRACT

A method and system for secure data storage and retrieval is provided. A sequence of data units is divided into multiple subsets of data units corresponding to multiple data channels. The multiple data channels are assigned to multiple data writers based on a key code. Then, each subset of data units is transferred to a writer via an assigned channel for writing to storage media. Thereafter, to securely retrieve the stored data, each subset of data units is read from the storage media using a data reader. The original sequence of data units can only be reassembled using the key code for properly reassembling the subsets of data units into their original sequence.

22 Claims, 6 Drawing Sheets

METHOD AND SYSTEM FOR SECURE DATA STORAGE

CROSS-REFERENCE TO RELATED APPLICATIONS

This patent application is a continuation patent application of U.S. patent application Ser. No. 11/971,144, filed on Jan. 8, 2008, the disclosure of which is incorporated herein its entirety by reference.

BACKGROUND

1. Field of the Invention

The present invention relates to data storage and in particular to security for storing data.

2. Background of the Invention

Data security is becoming more important with the exponential growth of data that is stored by various means, such as magnetic and optical data storage. Data encryption provides a user a layer of security, wherein data is encrypted and can be accessed using an encryption key. However, encryption may be overcome, exposing sensitive data to unauthorized access.

FIG. 1 shows a conventional system 10 that uses data encryption for secure data storage. Each data channel is assigned to a specific writer/reader (W-R) combination in a transducer head. The data is encrypted and written to tape. Specifically, FIG. 1 shows 16 channels assigned to a 16 W-R combination head, such that channel 1 is fixed to W-R 1, channel 2 is fixed to W-R 2, etc. Specifically, channel 1 data is written by writer 1 and read back by reader 1, the channel 2 data is written by writer 2 and read back by reader 2, and so on. The channel 1 data is from reader 1 and the channel 2 data is from reader 2, and so on. The data read back is then decrypted using a decryption key. However, once the encryption key becomes compromised, the data security in such a tape system is compromised. As such, additional or other techniques for providing data security are desirable.

BRIEF SUMMARY

A method and system for secure data storage and retrieval is provided. One embodiment involves dividing a sequence of data units into multiple subsets of data units corresponding to multiple data channels. The multiple data channels are assigned to multiple data writers based on a key code. Then, each subset of data units is transferred to a writer via an assigned channel for writing to storage media.

Thereafter, to securely retrieve the stored data, each subset of data units is read from the storage media using a data reader. The original sequence of data units can only be reassembled using the key code for properly reassembling the subsets of data units into their original sequence.

The key code is required to determine the sequence in which the read data units should be reassembled in proper sequence to obtain the original sequence of said plural data units. If the wrong key code is provided, then the data units cannot be reassembled in the proper sequence that represents the original data sequence.

BRIEF DESCRIPTION OF THE SEVERAL VIEWS OF THE DRAWINGS

FIG. 3 shows a functional block diagram of an example storage system that uses secure data storage on magnetic tape by using a key code according to the invention.

DETAILED DESCRIPTION

The invention provides a method and system for secure data storage and retrieval. One embodiment involves dividing (or separating) a sequence of data units into multiple subsets of data units corresponding to multiple data channels. The multiple data channels are assigned to multiple data writers based on a key code. Then, each subset of data units is transferred to a writer via an assigned channel for writing to storage media. Thereafter, to securely retrieve the stored data, each subset of data units is read from the storage media using a data reader. The original sequence of data units can only be reassembled using the key code for properly reassembling the subsets of data units into their original sequence. The key code is required to determine the sequence in which the read data units should be reassembled in proper sequence to obtain the original sequence of said plural data units. If the wrong key code is provided, then the data units cannot be reassembled in the proper sequence that represents the original data sequence.

Figure 2:
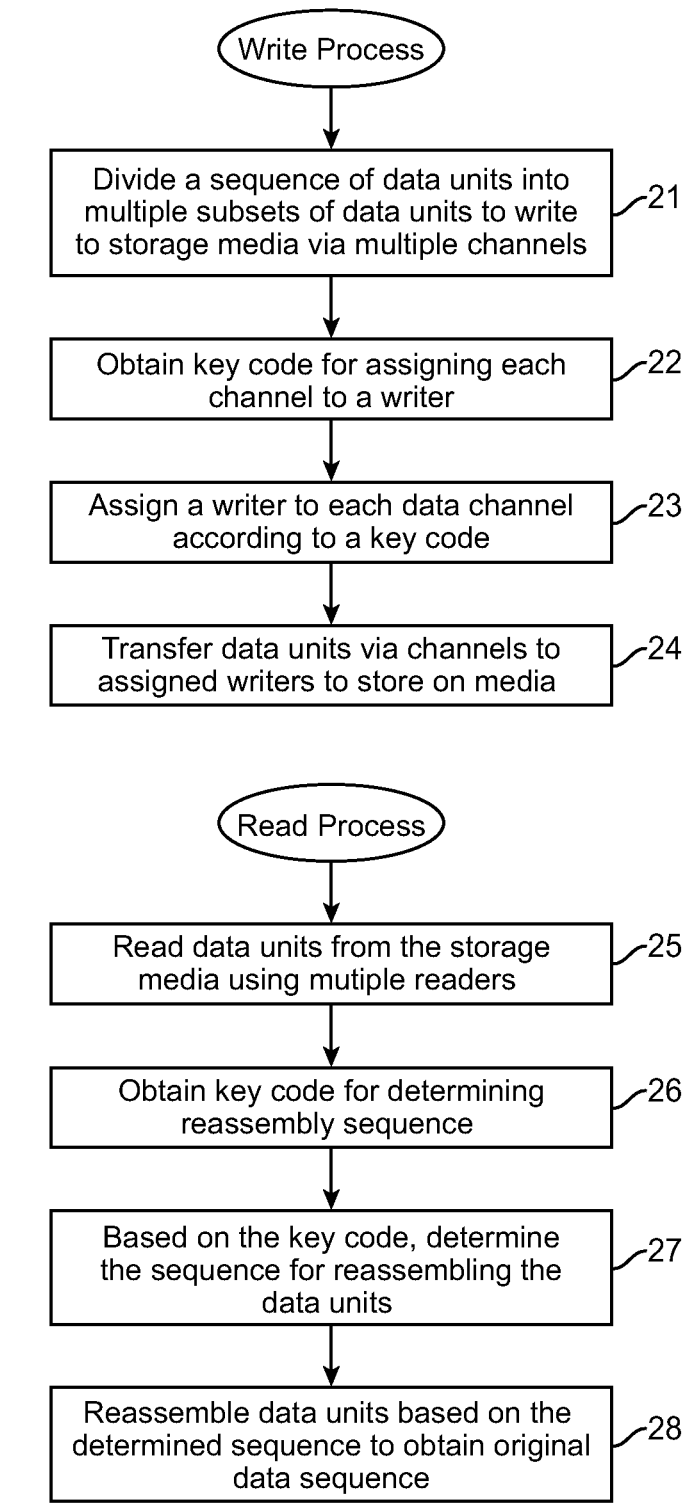
FIG. 2 shows flowcharts of the steps of secure data storage, by scrambling the data using a key code according to an embodiment of the invention.

FIG. 2 shows flowcharts of the steps involved in an implementation of a secure data storage process 20 according to the invention, wherein storing data involves dividing a sequence of plural data units into multiple channels of data, such that each channel corresponds to a subset of the multiple data units (step 21); obtaining a key code for scrambling the subset of data units by assigning each channel of data to a writer based on the key code (step 22); assigning a writer to each data channel according to a key code (step 23); and writing the subset of data units from each channel to storage media via the assigned writer (step 24).

Thereafter, retrieving the data involves reading data units from the storage media using multiple readers (step 25); obtaining a key code that was used in writing the data units (step 26); based on the obtained key code, determining the sequence in which the read data units should be reassembled in proper sequence to obtain the original sequence of said plural data units (step 27); and using the key code to combine and reassemble the read data units into the proper (original) data sequence (step 28). If the wrong key code was provided in step 26, then the data units are reassembled in a sequence that does not represent the proper data sequence.

In one example, such secure storage of data is implemented for data storage on one or more tape cartridges in a tape library system, wherein once the data is stored securely, both software and hardware mechanisms are required to decode and access such data.

Figure 1:
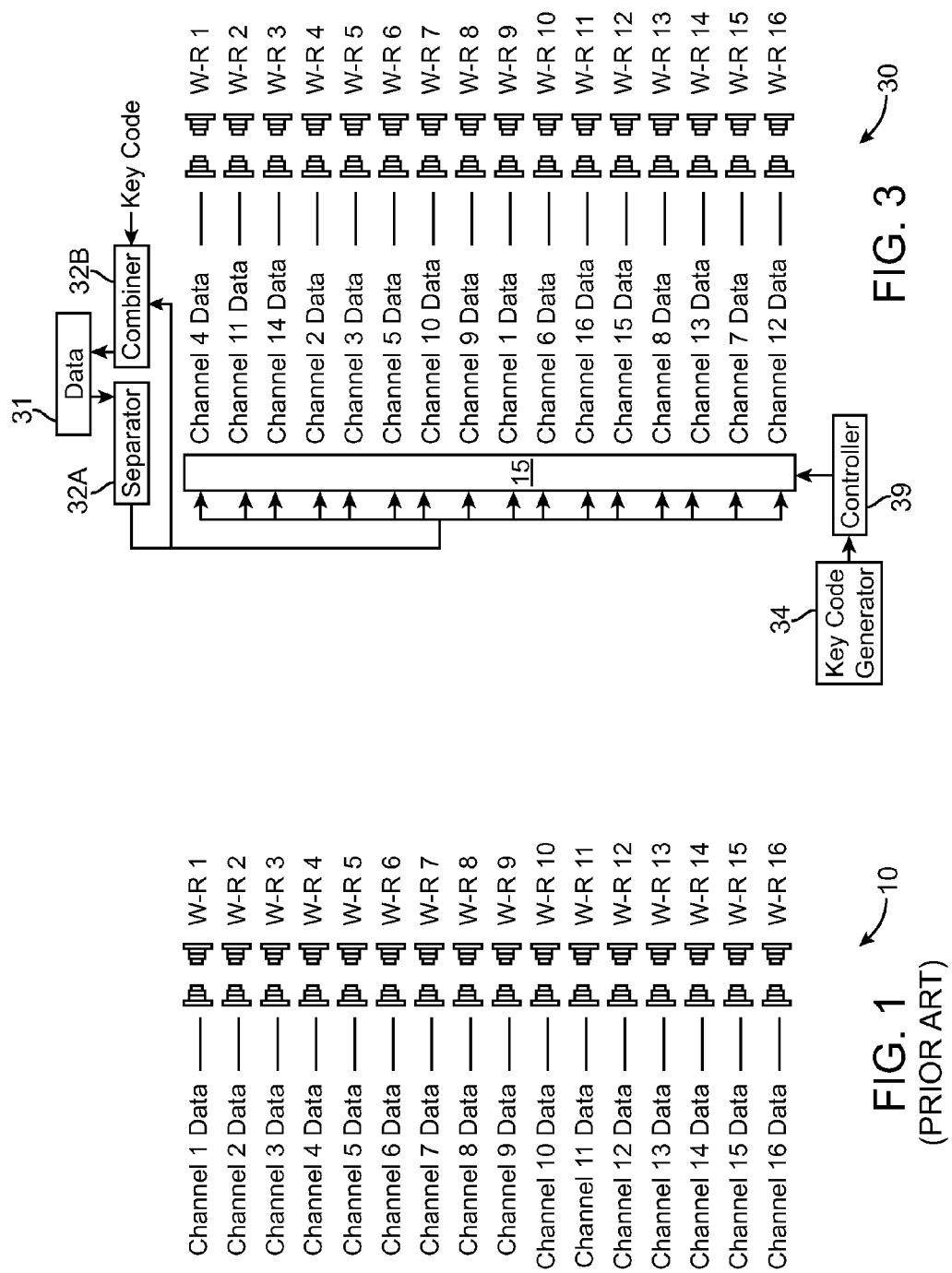
FIG. 1 shows a conventional storage system that uses data encryption for secure data storage on magnetic tape.

As noted, in conventional tape libraries, transfer of data between each data channel and tape media, is via a specific writer/reader combination. In FIG. 1, each data channel is assigned to a specific writer/reader (W-R) combination in a transducer head. As such, transfer of channel X data is always assigned to the specific W-R X, and during read back there is no variation in which reader is reading for which channel.

According to the invention, however, data of a particular format is separated into different channels, and written to tape via writers assigned to data channels based on a key code. Upon reading back the data, the key code is required to reassemble the read back data into its original format. Without the proper key code, the read back data cannot be reassembled into the proper format. Thus, the data is effectively scrambled when written on the tape, and without the proper key code, the data cannot be descrambled (reassemble) into its original format.

Specifically, the manner of assigning data transfer between channels and writers is varied based on a key code. A sequence of data units is divided into multiple channels, wherein each channel includes a subset of the data units. Then, each channel is assigned to a writer in a reader/writer combination, based on a key code. A different key code provides a different assignment of channel data to writers according to the invention, which is in contrast to assigning the same channel data to the same reader/writer combination as is conventional (FIG. 1).

Then, the data units are read back with the reader associated with each writer. The data units from different readers can be correctly reassembled only if the key code is available to determine the proper sequence in which the data units shown appear in a reassembled sequence.

FIG. 3 shows an example storage system according to the invention, wherein data 31 is separated/divided into multiple channels by a separator 32A. A key code generator 34 provides a key code to a controller 39 that controls an assignment module 15 that assigns each data channel to a W-R combination based on the key code.

As such, channel 1 data is not always assigned to writer 1, but rather assigned to a writer based on a key code. In one example, based on a key code, writer 1 receives data from channel 4, rather than always from channel 1 as is conventional. A different key code provides a different assignment of channel data to writers. For example, according to another key code, writer 1 may receive data from another channel, such as channel 9 or channel 10, etc.

The key code allows for scrambling of the sequence of channel data relative to the reader/writer combinations, as written to tape. For simplicity of description, in this example an original sequence of data units is separated into 16 data channels such that: channel 1 includes a subset of the data units appearing first in the sequence, channel 2 includes a subset of the data units appearing second in the sequence, channel 3 includes a subset of the data units appearing third in the sequence, and so on.

Using a key code representing the values 4, 11, 14, 2, 3, 5, 10, 9, 1, 6, 16, 15, 8, 13, 7 and 12, provides the following data channel to W-R scrambling for writing data:

Data channel 4 to W-R 1.
Data channel 11 to W-R 2.
Data channel 14 to W-R 3.
Data channel 2 to W-R 4.
Data channel 3 to W-R 5.
Data channel 5 to W-R 6.
Data channel 10 to W-R 7.
Data channel 9 to W-R 8.
Data channel 1 to W-R 9.
Data channel 6 to W-R 10.
Data channel 16 to W-R 11.
Data channel 15 to W-R 12.
Data channel 8 to W-R 13.
Data channel 13 to W-R 14.
Data channel 7 to W-R 15.
Data channel 12 to W-R 16.

Using the key code, the data written by the writer in W-R9 appears first in the data sequence before separation into channel 1, the data written by the writer in W-R4 appears second in data sequence before separation into channel 2, the data written by the writer in W-R5 appears third in sequence before separation into channel 3, and so on.

Upon reading back the data, the key code is required by a combiner 32B to reassemble the data into its original sequence. The data units from different readers can be correctly reassembled only if the key code is available to determine the proper sequence in which the data units should appear when reassembled. For example, in FIG. 2, upon reading back said subsets of data units using the readers in W-R1 through W-R16, the key code is required for reassembling the subsets of data units such that: the subset of data units read back by the reader in WR-1 appears first in the reassembled sequence, the subset of data units read back by the reader in WR-4 appears second in the reassembled sequence, the subset of data units read back by the reader in WR-5 appears third in the reassembled sequence, and so on.

In one example, the key code can be equal to or greater than the number of writers, such that for a 16 channel head, a 16 digit key code is generated with numbers ranging from 1-16. Additional digits and numbers can be generated for added levels of security. Additional layers of security can be added to the above process. For example, the data can be encrypted when written and decrypted using a decryption key when read back.

In addition to scrambling the data channels over the number of available channels, the data can spread across multiple drives and data cartridges. For example, if a library has two 8-channel tape drives running at the same time, a 16 digit key code can be generated and the data can be spread across two data tape cartridges. Therefore, even if an intruder obtains one cartridge and the key code, the data cannot be retrieved without having the other data cartridge as well.

Figure 4:
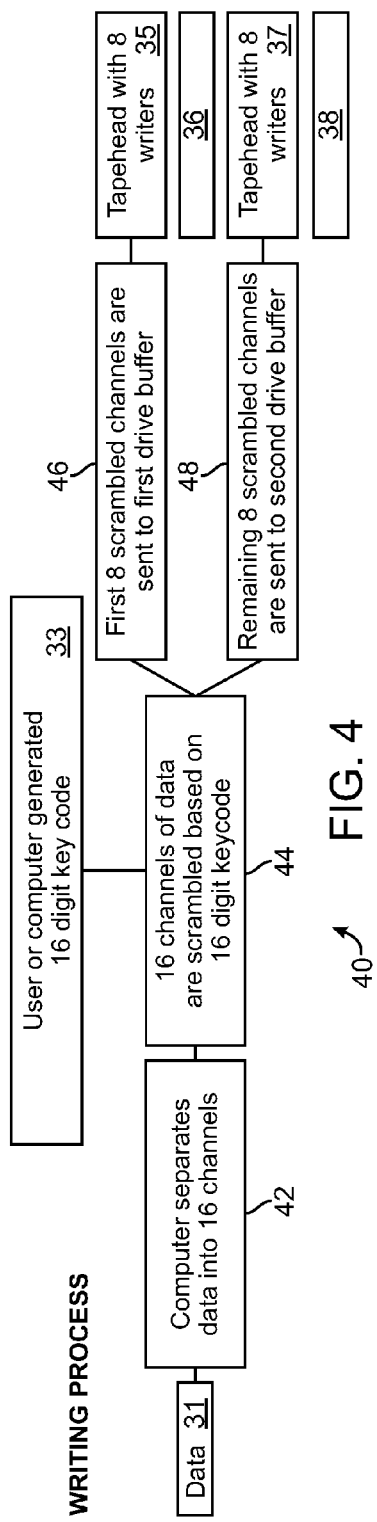
FIG. 4 shows an example process for writing data on tape storage media using a key code according to the invention.
Figure 5:
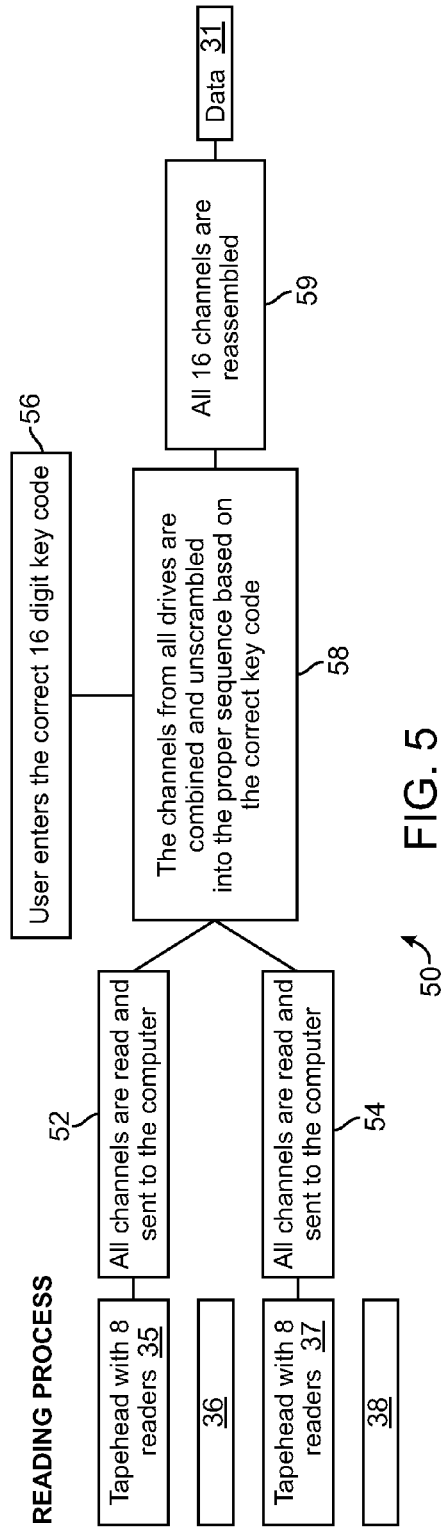
FIG. 5 shows an example process for reading data from tape storage media using a key code according to the invention.

FIGS. 4-5 show examples for secure data storage on two tape cartridges using two heads, according to the invention. Referring to FIG. 4, a writing process 40 that involves separating a sequence 31 of multiple data units, into 16 channels of data, wherein each channel includes a subset of the multiple data units (step 42). Then, a 16 digit key code 33 is used for scrambling the 16 channels of data based on the key code, such that 8 channels of data are assigned to 8 writers in the reader/writer combinations of one tape head 35, and the remaining 8 channels of data are assigned to 8 writers in the reader/writer combinations of another tape head 37 (step 44). Then, data for the tape head 35 is sent to a first buffer to be written to the tape cartridge 36 via the writers in the tape head 35, based on the channel-writer assignment according to the key code (step 46), and the data for the tape head 37 is sent to a second buffer to be written to the tape cartridge 38 via the writer in the tape head 37, based on the channel-writer assignment according to the key code (step 48). The data is written to tape accordingly.

FIG. 5 shows a process 50 for reading data that was written using the process 40. The process 50 involves reading data units from cartridge 36 using readers of the tape head 35 for 8 data channels (step 52), and reading data units from cartridge 38 using the readers of the tape head 37 for another 8 data channels (step 54). Then, the proper key code is requested (step 56). The proper key code is the one that was used in the process 30 (FIG. 3) above to write the data units. The provided key code is then used to determine the sequence in which data units read by each reader should be reassembled to obtain the proper data sequence 31 (step 58). The key code is used to combine and reassemble the data units into the proper data sequence 31 (step 59). If the wrong key code was provided in step 56, then the data units are reassembled in a sequence that does not represent the proper data sequence 31.

Other examples of separating a data sequence into multiple data channels, assigning the data channels to writers based on a key code for storage, and reassembling data read back by readers based on the key code into proper sequence, according to the invention, are possible and contemplated by the invention.

Figure 6:
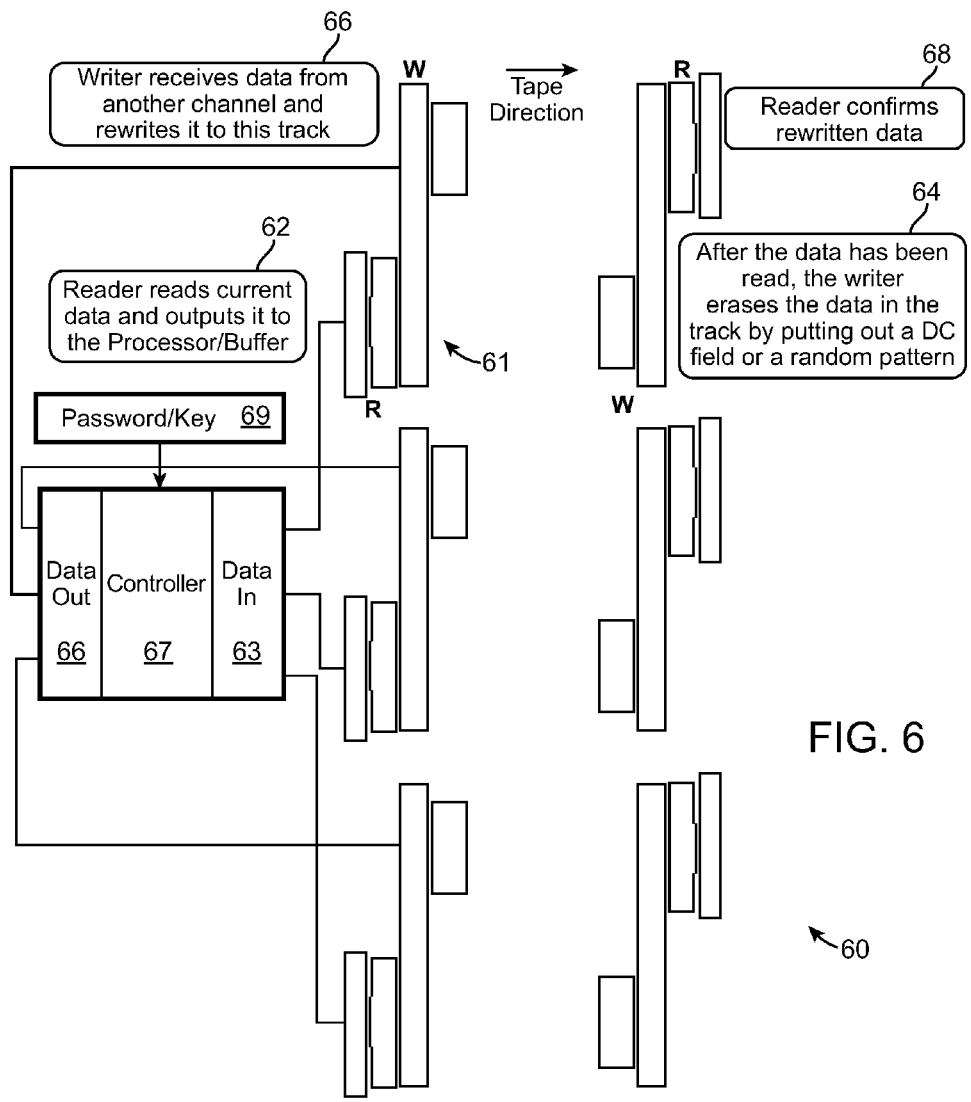
FIG. 6 shows an example block diagram of another tape drive system that uses key codes for storing data on magnetic tape storage media according to the invention.

Also provided is a method of changing the key code and re-scrambling the data according to another key code. This involves reading back data that was written using one key code, and rewriting it using another key code. FIG. 6 shows an example process 60 which involves: using a reader (R) in a reader/writer combination in a transducer head 61 for reading back into a buffer 63 data that was written to a tape track by a writer (W) assigned using one key code (step 62), erasing the data in the track (step 64), the writer receiving data from another channel via a buffer 65 to rewrite in the track, wherein the channel is assigned to the writer by a controller 67 based on a new key code 69 (step 66) and the reader reconfirming the rewritten data (step 68). The controller 67 can be similar to the controller 39 in FIG. 3.

Figure 7:
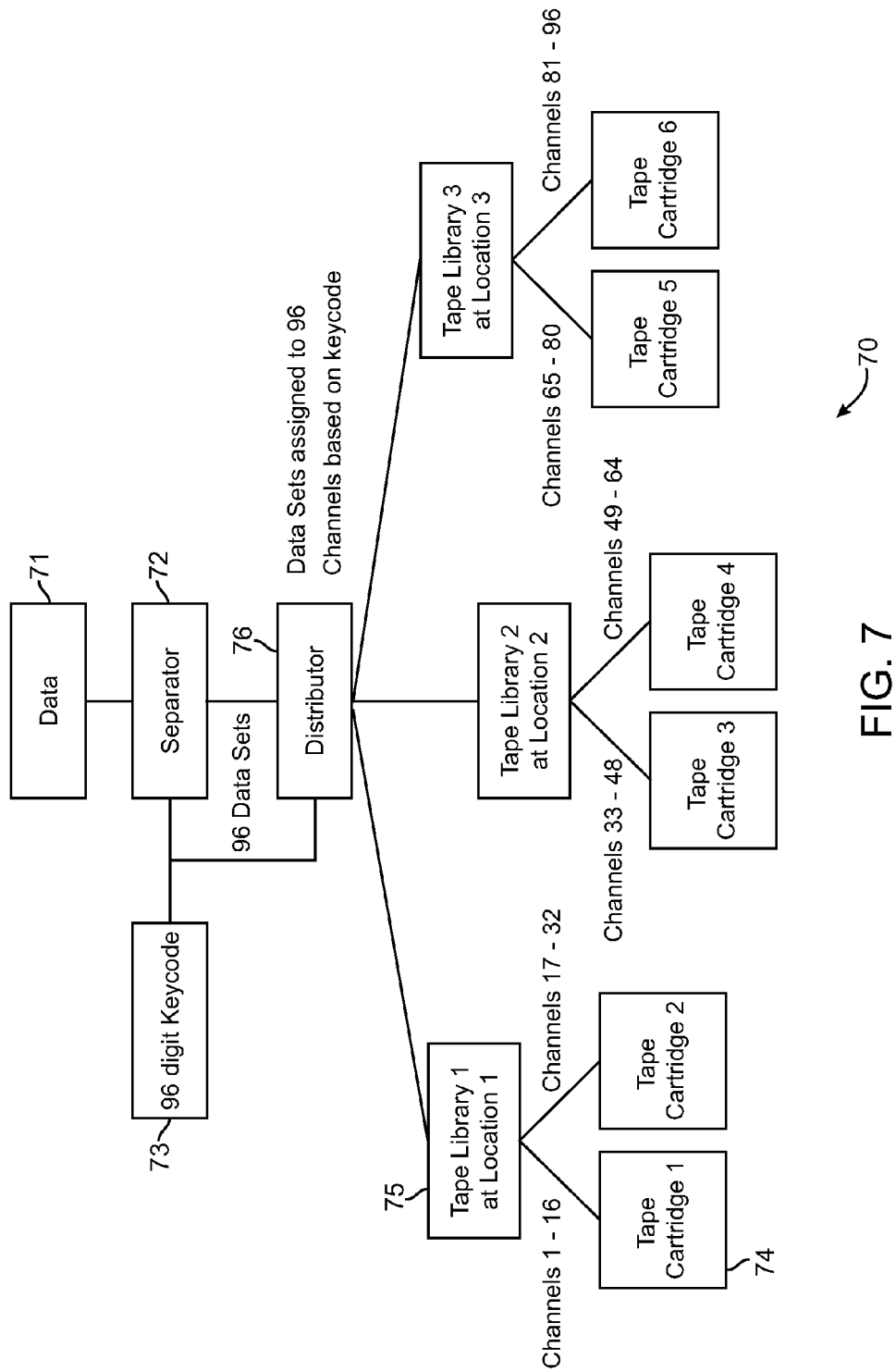
FIG. 7 shows an example block diagram of another tape drive system that uses key codes for storing data on magnetic tape storage media according to the invention.

Referring to the data storage system 70 in FIG. 7, in another embodiment, user data 71 can be separated by a separator module 72 into multiple channels (e.g., channels 1-16, 17-32, 33-48, 49-64, 65-80 and 81-96) based on a keycode 73, which can then be distributed by a distributor module 76 to be written onto multiple tape cartridges 74 with multiple tape drives in different tape libraries 75 which may be at different tape locations. The data can only be retrieved with the proper keycode 73, which allows the data to be recombined, and with the proper tape cartridges (i.e., even if multiple tape cartridges and the keycode were compromised, the data on the tape cartridges is useless unless someone has all the cartridges). In the retrieval process, a distributor 76 becomes a buffer for the incoming data, and the separator 72 becomes a combiner to properly recreate the data 71.

Figure 8:
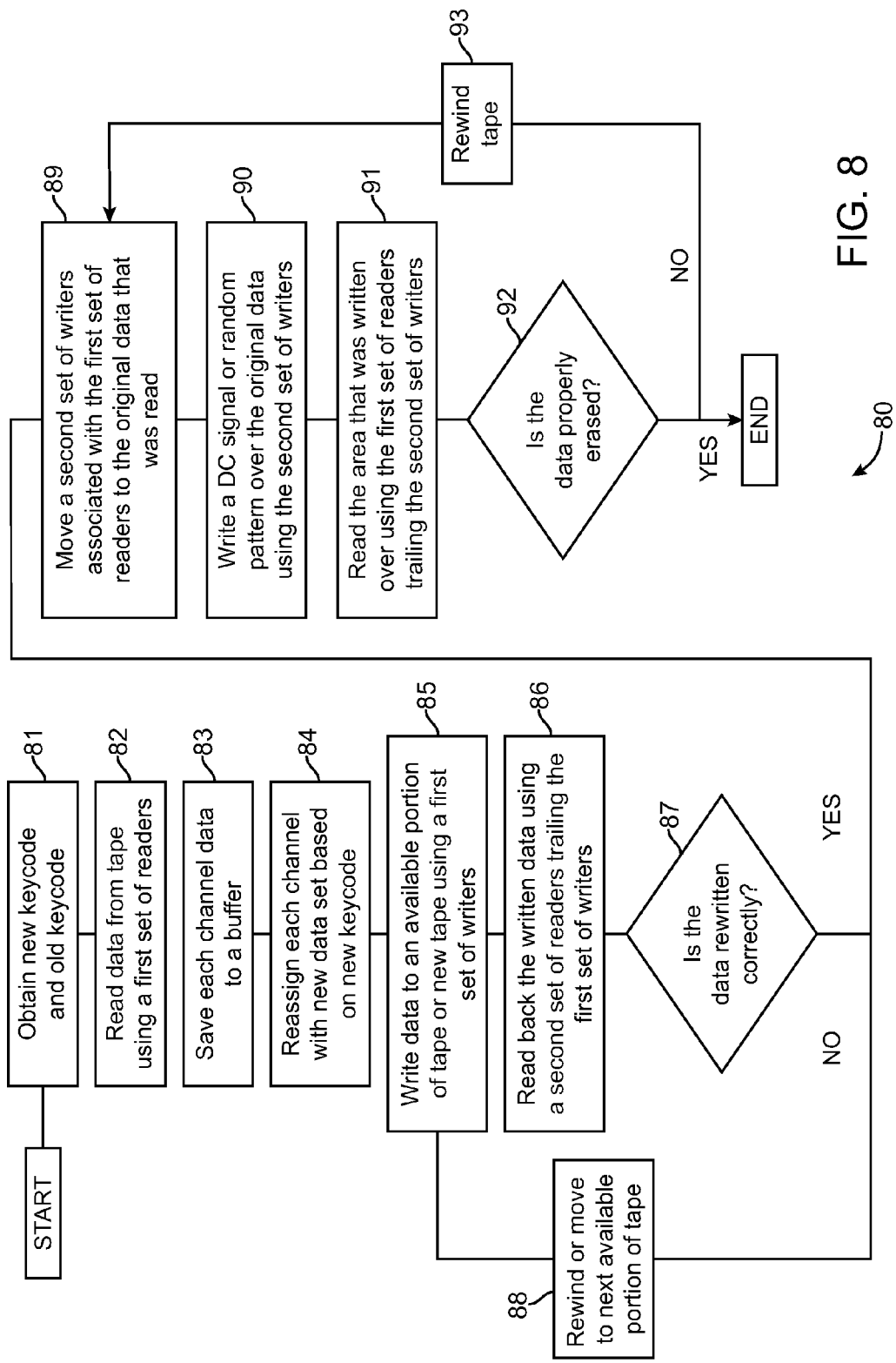
FIG. 8 shows an example block diagram of another tape drive system that uses key codes for storing data on magnetic tape storage media according to the invention.

As noted, FIG. 6 shows a method for changing the keycode and in turn, rewriting the data based on the new keycode. In another embodiment, a keycode can change without the necessity of rewriting the data. For example, the keycode can be changed based on a formula so that to retrieve the data, the separator only needs to undo the formula to obtain the original keycode. In yet another embodiment, if the user prefers the data to be rewritten based on a new keycode; an example process 80 shown in FIG. 8 illustrates rewriting data based on a new keycode according to the invention. The process 80 includes the following steps:

Step 81: Obtain a new keycode and the old keycode.
Step 82: Read data from tape using a first set of readers.
Step 83: Save each channel data to a buffer.
Step 84: Reassign each channel with a new data set based on the new code.
Step 85: Write data to an available portion of tape or new tape using a first set of writers.
Step 86: Read back the written data using a second set of readers trailing the first set of writers.
Step 87: Is the data rewritten correctly? If no, step 88, else step 89.
Step 88: Rewind or move to next available tape portion. Go back to step 85.
Step 89: Move a second set of writers associated with the first set of readers to the original data that was read.
Step 90: Write a DC signal (erase) or random pattern over the original data using the second set of writers.
Step 91: Read the area that was written over using the first set of readers trailing the second set of writers.
Step 92: Is the data properly erased. If yes, end the process, else go to step 93.
Step 93: Rewind tape. Go back to step 89.

The steps in process 80 can be implemented in a system such as shown in FIG. 6 or other storage systems.

The invention is not limited to specific tape system architecture. It can be employed for enterprise library with virtualization engine or a basic personal computer with a SCSI board and a tape drive attached to it. The invention only calls for a tape drive or tape drives and a controller that sends data to it. All other subsystems that do encryption, networking, interoperability, etc., are not necessary.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of storing data on storage media, comprising:
   assigning each subset of multiple subsets of data units to a different writer based on an obtained encryption key code;
   writing the multiple subsets of the data units to multiple storage media out of order; and
   changing the encryption key code and re-assigning each subset to a different writer based on the changed encryption key code.

2. The method of claim 1, further comprising writing an ordered sequence of multiple subsets of the data units based on distributing the subsets from the ordered sequence across the multiple storage media in an out of order sequence by writing each subset to the multiple storage media using the assigned writer.

3. The method of claim 2, further comprising:
   retrieving the out of order sequence of subsets from the multiple storage media; and
   reassembling the retrieved out of order sequence of subsets into the ordered sequence based on an obtained decryption key code.

4. The method of claim 3, further comprising:
   assigning each subset to a different reader based on the encryption key code; and
   dividing the sequence of plural data units into multiple channels of data, such that each channel of data corresponds to a subset of the data units.

5. The method of claim 3, further comprising assigning each channel of data to a different writer based on the encryption key code.

6. The method of claim 3, further comprising scrambling each subset based on the changed encryption key code by reading each subset from the multiple storage media using the assigned reader and re-writing the ordered sequence of multiple subsets of the data units to multiple storage media out of order based on the changed encryption key.

7. The method of claim 3, wherein retrieving the sequence of plural data units from the multiple storage media comprises:
   reading each subset from the multiple storage media using the assigned reader; and
   based on the decryption key code, determining a sequence in which the read subsets should be reassembled to obtain the ordered sequence of plural data units arranged in the ordered sequence.

8. The method of claim 7, wherein:
   the subsets are written to the multiple storage media using different writers; and
   the subsets are read from the multiple storage media using different readers.

9. An apparatus for storing data on storage media, comprising:
   a controller that:
      assigns each subset of multiple subsets of data units to a different writer based on an obtained encryption key code; and
      writes the multiple subsets of the data units from the ordered sequence of plural data units to multiple storage media,
      wherein the controller changes the encryption key code and re-assigns each channel of data to a different writer based on the changed encryption key code.

10. The apparatus of claim 9, wherein the controller further:
   obtains the encryption key code and a decryption key code;
   obtains the multiple subsets of data units from an ordered sequence of plural data units; and
   divides the ordered sequence of plural data units into multiple channels of data, such that each channel of data corresponds to a subset of the data units.

11. The apparatus of claim 9, wherein the multiple subsets of data are written out of order by distributing the multiple subsets across the multiple storage media in an out of order sequence by writing each subset to the multiple storage media using the assigned writer.

12. The apparatus of claim 10, wherein the controller dissasembles the ordered sequence of plural data units from an original order by:
   assigning each channel of data to a different writer based on the encryption key code; and
   writing the multiple subsets of the data units from each channel of data to the multiple storage media via the assigned writer.

13. The apparatus of claim 12, further comprising a combiner that reassembles the multiple subsets of data units read from the multiple storage media using the decryption key code.

14. The apparatus of claim 13, further comprising the controller scrambling each subset based on the changed encryption key code by reading each subset from the multiple storage media using the assigned reader and re-writing the ordered sequence of multiple subsets of the data units to multiple storage media out of order based on the changed encryption key.

15. The apparatus of claim 13, wherein the encryption key code allows for disassembling the ordered sequence of plural data units from the original sequential order by splitting the ordered sequence of plural data units among different writers.

16. The apparatus of claim 9, wherein the controller rewrites the multiple subsets of the data units from each channel of data to the multiple storage media via the assigned writers.

17. A method for scrambling data on storage media comprising:
   assigning each subset of multiple subsets of data units to a different writer based on an obtained encryption key code;
   scrambling data by writing the multiple subsets of the data units to multiple storage media out of order; and
   changing the encryption key code and re-assigning each subset to a different writer based on the changed encryption key code.

18. The method of claim 17, further comprising:
   dividing a sequence of plural data units arranged in an ordered sequence into the multiple subsets of the data units;
   obtaining a decryption key code;
   retrieving the out of order sequence of subsets from the multiple storage media; and
   reassembling the retrieved out of order sequence of subsets into the ordered sequence based on the decryption key code.

19. The method of claim 18, further comprising re-scrambling the data on the storage media based on the changed encryption key code by reading each subset from the multiple storage media using the assigned reader and re-writing the ordered sequence of multiple subsets of the data units to multiple storage media out of order based on the changed encryption key.

20. The method of claim 18, wherein writing the ordered sequence comprises distributing the subsets from the ordered sequence across the multiple storage media in an out of order sequence by writing each subset to the multiple storage media using the assigned writer.

21. The method of claim 20, further comprising:
   assigning each subset to a different reader based on the encryption key code; and
   dividing the sequence of plural data units into multiple channels of data, such that each channel of data corresponds to a subset of the data units.

22. The method of claim 21, further comprising assigning each channel of data to a different writer based on the encryption key code.

* * * * *